(12) United States Patent
Magnusson et al.

(10) Patent No.: US 11,433,904 B2
(45) Date of Patent: *Sep. 6, 2022

(54) ROAD CONDITION MONITORING

(71) Applicant: Nira Dynamics AB, Linköping (SE)

(72) Inventors: Per Magnusson, Linköping (SE); Thomas Svantesson, Linköping (SE)

(73) Assignee: Nira Dynamics AB, Linköping (SE)

( * ) Notice: Subject to any disclaimer, the term of this patent is extended or adjusted under 35 U.S.C. 154(b) by 12 days.

This patent is subject to a terminal disclaimer.

(21) Appl. No.: 17/176,430

(22) Filed: Feb. 16, 2021

(65) Prior Publication Data

US 2021/0221380 A1   Jul. 22, 2021

Related U.S. Application Data

(63) Continuation of application No. 16/624,959, filed as application No. PCT/EP2018/065048 on Jun. 7, 2018, now Pat. No. 10,953,887.

(51) Int. Cl.
*B60W 40/06* (2012.01)
*B60W 30/095* (2012.01)
(Continued)

(52) U.S. Cl.
CPC ........ *B60W 40/06* (2013.01); *B60W 30/0956* (2013.01); *G08G 1/0112* (2013.01);
(Continued)

(58) Field of Classification Search
CPC ........ B60W 2552/00; B60W 30/0956; B60W 40/06; B60W 2552/05; B60W 2552/10; B60W 2552/15; B60W 2552/20; B60W 2552/25; B60W 2552/30; B60W 2552/35; B60W 2552/40; B60W 2552/45; B60W 2552/50; B60W 2552/53; B60W 40/064; B60W 40/068; B60W 40/072;
(Continued)

(56) References Cited

U.S. PATENT DOCUMENTS

| | | |
|---|---|---|
| 9,108,640 B2 | 8/2015 | Jackson |
| 2012/0053755 A1 | 3/2012 | Takagi |

(Continued)

FOREIGN PATENT DOCUMENTS

WO   WO-2016/060161 A1   4/2016

OTHER PUBLICATIONS

Office Action issued in European patent application No. 18 743 684.5, dated Oct. 22, 2021.

*Primary Examiner* — Sisay Yacob
(74) *Attorney, Agent, or Firm* — Faegre Drinker Biddle & Reath LLP

(57) ABSTRACT

A system for monitoring the condition of a road surface travelled by a plurality of vehicles, each including at least one sensor, is provided. The system includes a central processing arrangement arranged to: map at least a part of the road surface with a number of cells; receive road surface data for the cells, which road surface data is based on measurements made by the sensors as the plurality of vehicles travel on the road surface; and calculate a probability for at least one road surface parameter for each cell travelled by the plurality of vehicles based at least on road surface data received from the plurality of vehicles.

20 Claims, 6 Drawing Sheets

(51) Int. Cl.
    *G08G 1/01*     (2006.01)
    *G08G 1/16*     (2006.01)
(52) U.S. Cl.
    CPC ............ *G08G 1/0141* (2013.01); *G08G 1/164* (2013.01); *B60W 2552/00* (2020.02)
(58) Field of Classification Search
    CPC ........... B60W 40/076; B60W 30/0953; B60W 30/095; G08G 1/164; G08G 1/0141; G08G 1/0112; G08G 1/0145; G08G 1/0133; G08G 1/0129; G08G 1/0125; G08G 1/165; G08G 1/166; G08G 1/167; G08G 1/168; G08G 1/0116; G01C 21/3492
    See application file for complete search history.

(56)              References Cited

U.S. PATENT DOCUMENTS

| | | |
|---|---|---|
| 2013/0317744 A1 | 11/2013 | Mieth et al. |
| 2014/0025292 A1* | 1/2014 | Stahlin ................. G08G 1/0112 701/461 |
| 2014/0303806 A1* | 10/2014 | Bai .................... G01C 21/3697 701/1 |
| 2015/0224925 A1 | 8/2015 | Hartmann |
| 2017/0241778 A1* | 8/2017 | Hanatsuka ............... G08G 1/13 |
| 2019/0291726 A1 | 9/2019 | Shalev-Shwartz et al. |
| 2020/0139976 A1 | 5/2020 | Magnusson et al. |

\* cited by examiner

ROAD CONDITION MONITORING

CROSS-REFERENCE TO PRIOR APPLICATIONS

This application is a continuation of U.S. patent application Ser. No. 16/624,959, filed Dec. 20, 2019 now U.S. Pat. No. 10,953,887, issued Mar. 23, 2021, which is a § 371 National Stage Application of PCT International Application No. PCT/EP2018/065048 filed Jun. 7, 2018, which claims priority to Swedish Application No. 1750787-2 filed on Jun. 20, 2017, each of which are herein incorporated by reference in their entirety.

TECHNICAL FIELD

The present disclosure relates generally to systems and methods for monitoring the condition of a road surface.

BACKGROUND

Systems that provide vehicles with information about the road conditions may be used to increase road safety for conventional vehicles, but will become increasingly important with the introduction of autonomously driving vehicles. If a vehicle has information about e.g. the friction on the road, and/or whether there is damage such as potholes in the road, warnings can be given to the driver/vehicle, and the driver/vehicle can adapt to the road condition. For example, automatic braking systems can adapt to the friction on the road.

US20150224925 describes a method for determining a state of a pavement. Data received from at least one sensor that measures a local friction coefficient is assigned to individual image sectors of a camera image collected by a forward facing camera. Image analysis then provides a classification of individual pavement segments in camera images to different classes, such as e.g. dry, wet, snow-covered or icy, and friction coefficients are assigned to these segments based on previously collected local friction coefficients for image segments belonging to the same class. The method may use a camera image divided into a two-dimensional grid in the plane of the pavement, in which case friction coefficients are assigned to the cells of the grid.

U.S. Pat. No. 9,108,640 describes a method for monitoring and reporting road quality. Various sensors are used for determining road quality in a vehicle, and this data is transmitted, together with the vehicle's location, though a mobile network to a central server for distribution in road quality reports. A method for determining an average road quality indication based on aggregated data from multiple vehicles is also described. This method may involve calculating a weighted mean, giving more weight to road quality indications coming from trusted and known sources than those coming from non trusted and unknown sources.

US20120053755 describes a method of calculating the occupancy probability for a road surface using occupancy grid maps.

PROBLEMS WITH THE PRIOR ART

While US20150224925 addresses the general problem of monitoring the condition of a road surface, it does not address the issue of aggregating information from a plurality of vehicles.

While U.S. Pat. No. 9,108,640 addresses the general problem of how to merge data from different vehicles, it only proposes to calculate mean values. This may sometimes give misleading results, especially since e.g. friction data is only valid a certain period of time after retrieval, and e.g. potholes may grow over time or quickly disappear due to mending.

US20120053755 does not address the monitoring of any condition of a road surface.

There is thus a need for an improved road condition monitoring system.

SUMMARY

The above described problem is addressed by the claimed system for monitoring the condition of a road surface travelled by a plurality of vehicles, each comprising at least one sensor. The system comprises a central processing arrangement arranged to: map at least a part of the road surface with a number of cells; receive road surface data for the cells, which road surface data is based on measurements made by the sensors as the plurality of vehicles travel on the road surface; and calculate a probability for at least one road surface parameter for each cell travelled by the plurality of vehicles based on road surface data received from the plurality of vehicles. The central processing arrangement may e.g. be cloud-based, and aggregate road surface data from many different sources.

The above described problem is further addressed by the claimed method for monitoring the condition of a road surface travelled by a plurality of vehicles, each comprising at least one sensor. The method comprises: mapping at least a part of the road surface with a number of cells; determining road surface data for the cells based on measurements made by the sensors as the plurality of vehicles travel on the road surface; transferring the road surface data from the plurality of vehicles to a central processing arrangement; and calculating a probability for at least one road surface parameter for each cell travelled by the plurality of vehicles based at least on road surface data received from the plurality of vehicles.

This enables an easy merging of many different kinds of road surface data, e.g. in the cloud, in order to provide accurate road surface parameters.

In embodiments, the central processing arrangement is further arranged to update the probability based on a road surface parameter specific updating model that is adapted to the expected development over time of the probability for the specific road surface parameter until further road surface data is received for the cell. The road surface parameter specific updating model may e.g. include the probability increasing or decreasing over time, e.g. exponentially. This enables accurate estimations of road surface parameters over time even if no new road surface data has been received.

In embodiments, the probability of each of a predefined number of possible values or value intervals for the at least one road surface parameter is calculated, wherein the sum of the probabilities of these values or value intervals for the road surface parameter preferably is 1 (100%).

In embodiments, the probability for the at least one road surface parameter is calculated in the form of a function, such as e.g. a polynomial function.

In embodiments, the at least one road surface parameter comprises a road surface friction parameter $p_f$, a road roughness parameter $p_r$, a pothole parameter $p_h$, a speed-bump parameter $p_b$ and/or an obstacle parameter $p_o$.

In embodiments, the at least one sensor comprises a rotational speed sensor for each wheel of each of the plurality of vehicles. A number of different road surface parameters may be estimated based on signals from such sensors.

In embodiments, each vehicle comprises at least one vehicle processing device, and the road surface data for each vehicle is determined in the at least one vehicle processing device based on signals from the at least one sensor in the vehicle.

In embodiments, the central processing arrangement is arranged to calculate the probability for the at least one road surface parameter based also on road surface data received from other sources, such as sources of weather data. This enables the updating of road surface parameter probabilities even when no vehicles travel on the road surface. The weather data may e.g. relate to current and/or expected temperature, precipitation, water amount and/or snow amount. The weather data may e.g. be processed using a weather model that estimates the friction as a probability distribution based on the weather data.

In embodiments, the central processing arrangement is arranged to receive the road surface data via wireless link from the plurality of vehicles.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The present disclosure relates generally to systems and methods for monitoring the condition of a road surface. Embodiments of the disclosed solution are presented in more detail in connection with the figures.

Figure 1:
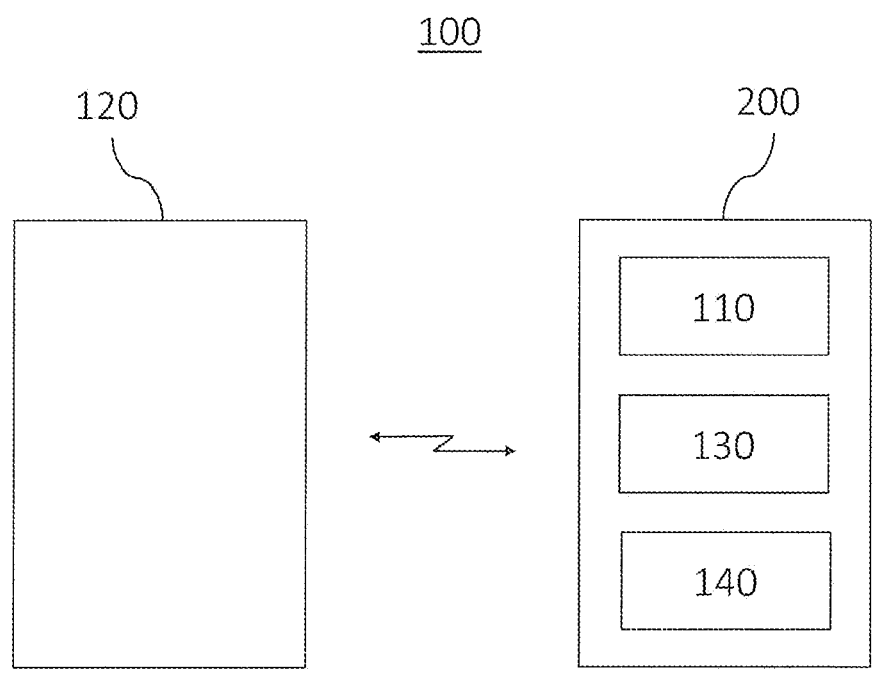
FIG. 1 schematically illustrates a system for monitoring the condition of a road surface, in accordance with one or more embodiments described herein.

FIG. 1 schematically illustrates a system 100 for monitoring the condition of a road surface travelled by a plurality of vehicles 200, in accordance with one or more embodiments described herein. The system 100 comprises a central processing arrangement 120, which may e.g. be cloud based.

The vehicle 200 shown schematically in FIG. 1 comprises at least one sensor 130, a vehicle processing device 110 and a GPS receiver 140.

Figure 2:
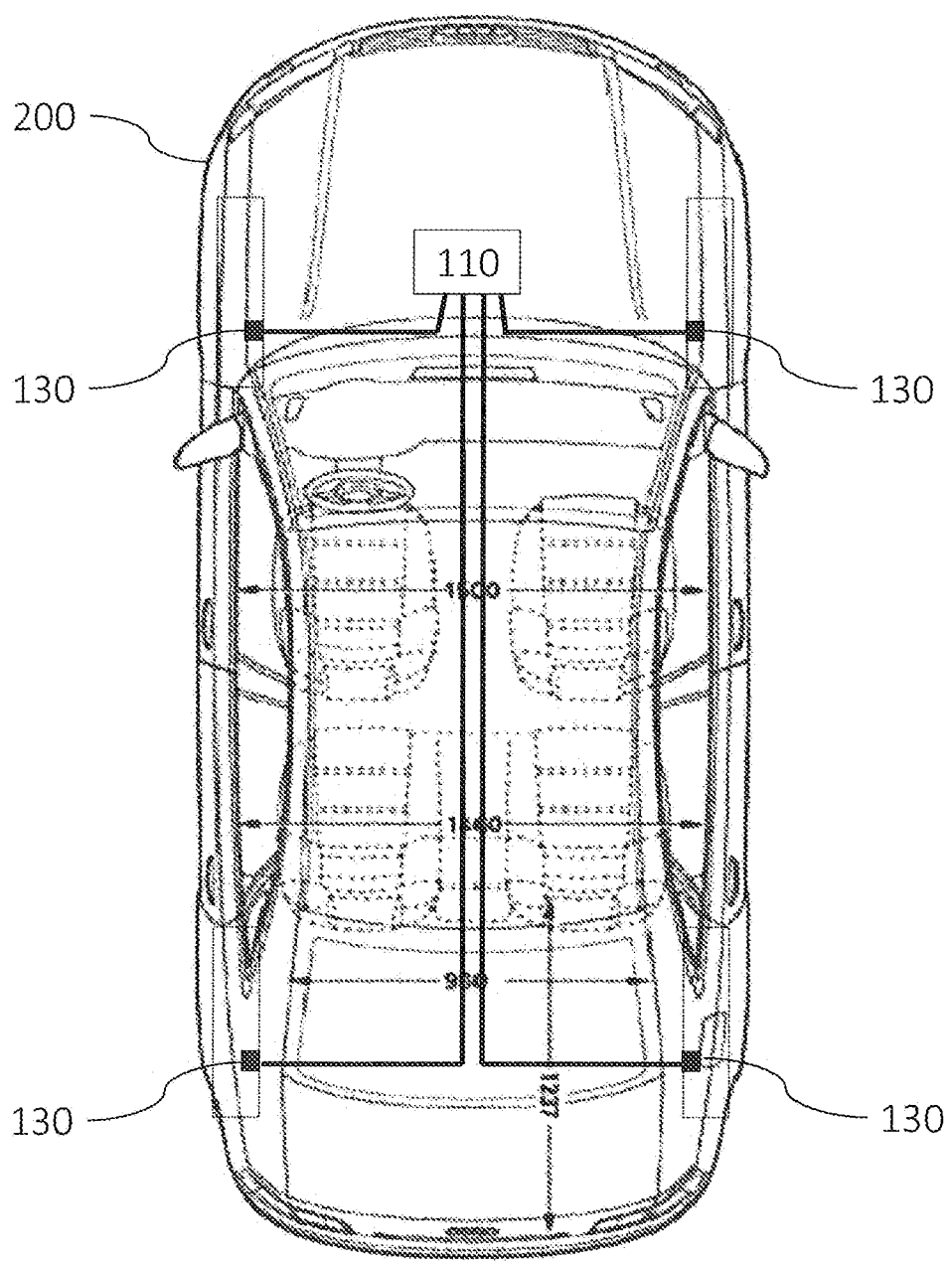
FIG. 2 schematically illustrates a vehicle, in accordance with one or more embodiments described herein.

FIG. 2 schematically illustrates a vehicle 200, in accordance with one or more embodiments described herein. The vehicle 200 shown in FIG. 2 comprises a vehicle processing device 110 and four sensors 130.

The sensors may e.g. be rotational speed sensors 130, one for each wheel. The sensors 130 may also be other types of sensors. For determining load changes in the vehicle, information about e.g. the torque and the engine RPM may be needed, and this can e.g. be determined based on measurements from various engine sensors. A pressure sensor such as e.g. a barometer may be used to determine the altitude, and based on this determine whether the vehicle is driving uphill or downhill. Various types of accelerometers and/or gyroscopes, e.g. in the form of an inertial measurement unit (IMU), may be used to determine e.g. yaw rate, longitudinal acceleration and vertical acceleration, to be used for determine load changes in the vehicle. Axle height information may e.g. be provided by sensors which are arranged in the vehicle for adapting the direction of the vehicle lights. The absolute velocity may e.g. be determined using a GPS sensor, or using another velocity recognizing sensor such as a camera, a radar, an IR sensor, or a laser sensor. Information from a temperature sensor may assist in determining friction.

The signals from the sensors 130 may be transferred, e.g. wirelessly, either directly from the sensors 130 to the central processing arrangement 120, or via the vehicle processing device 110. Road surface data may be determined based on the signals from the at least one sensor 130, either in the vehicle processing device 110 or in the central processing arrangement 120. The central processing arrangement 120 may e.g. be cloud-based, and aggregate road surface data from many different sources.

Figure 3:
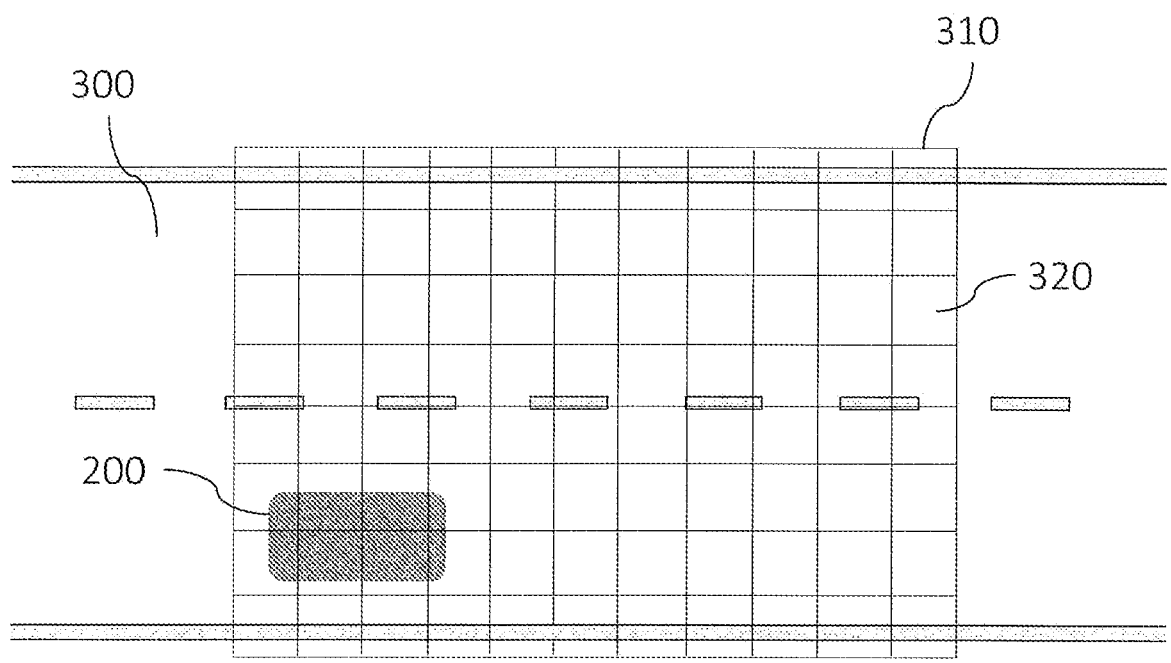
FIG. 3 schematically illustrates a road surface mapped with a grid, in accordance with one or more embodiments described herein.
Figure 4:
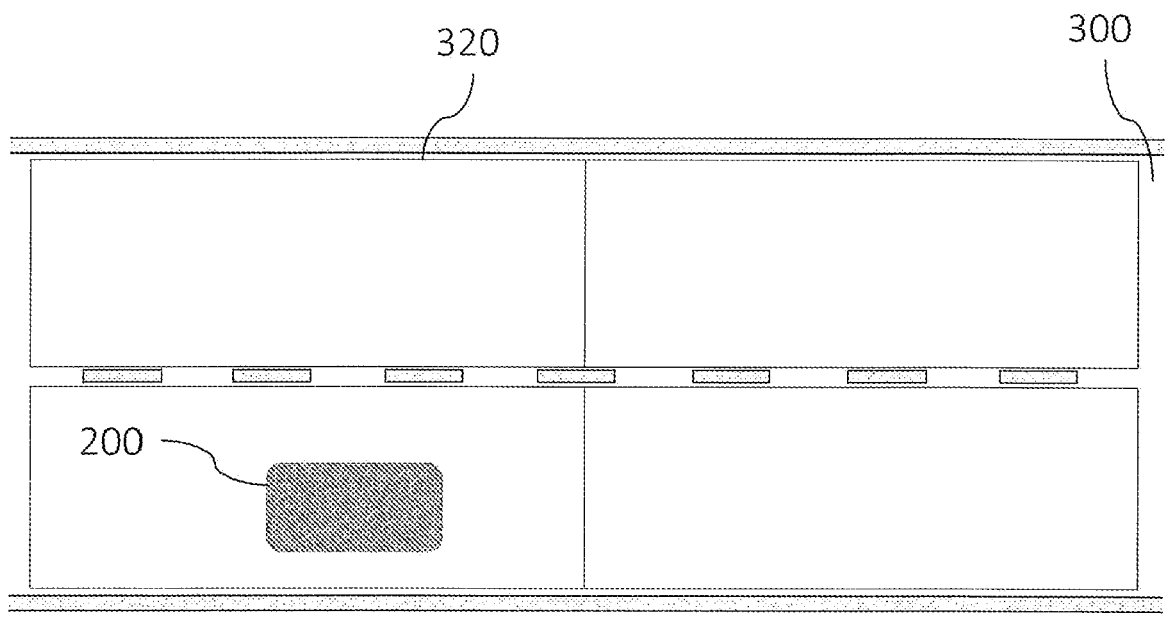
FIG. 4 schematically illustrates a road surface mapped with segments, in accordance with one or more embodiments described herein.

The central processing arrangement 120 may be arranged to map the road surface 300 with a number of cells 320, which may e.g. be cells 320 forming an array or grid 310, as shown in FIG. 3, or cells 320 in the form of segments of the road, as shown in FIG. 4. The sensor 130, which is arranged in the vehicle 200, may make measurements as the vehicle 200 travels on the road surface 300. Signals from the sensor 130, or road surface data determined based on them, may be transmitted from the vehicle 200 to the central processing arrangement 120 via wireless link, e.g. using the vehicle processing device 110. The central processing arrangement 120 may then calculate the probability for at least one road surface parameter for each cell 320 based on road surface data received from a plurality of vehicles 200.

The cells 320 may have any size or shape. If many vehicles travel different parts of the road so that the central processing arrangement 120 receives a lot of road surface data, and the exact location of these vehicles is known (from e.g. GPS data), a small cell size as shown in FIG. 3 may be desirable, since this provides a high resolution of the data, which is useful for e.g. locating potholes. However, for less travelled road stretches, where there will not be road surface data collected for all parts of the road surface 300, it may be better to use cells 320 in the form of larger road segments, so that there will at least be relevant road friction data for the segment as a whole. Such segments may have any size, such as 1 m long, 10 m long or even 100 m long. If the road has several lanes in each direction, each lane may have its own segment, since e.g. the friction may be different in lesser travelled lanes than in more travelled lanes. It is however also possible to consider the whole road, along a certain length such as e.g. 50 m, to be a cell 320.

Each cell 320 may be assigned a probability for each of a number of different road surface parameters. The road surface parameters for each cell 320 may e.g. be a road surface friction parameter $p_f$, a road roughness parameter $p_r$, a pothole parameter $p_h$, a speedbump parameter $p_b$, and/or an obstacle parameter $p_o$. Other parameters could also be used, such as e.g. a parameter describing the amount of water on the road. Each of these parameters may be assigned a number of different values, which may be calculated based on road surface data determined based on signals from the sensors 130. The probabilities for each of these parameters may alternatively be expressed as a value interval or as a function, e.g. a polynomial, instead of as a number of discrete values.

The road surface friction parameter $p_f$ may e.g. be assigned a value from 1 to 3, where 3 defines "high friction" and 1 defines "low friction". The road surface friction parameter $p_f$ should thus be assigned 1 if the friction is high (good grip), 2 if the friction is medium (e.g. gravel or snow), and 3 if the friction is low (e.g. ice). It is of course possible to classify the friction in other, more detailed ways, using many more friction classes, or even using the actual friction coefficients calculated in the vehicles 200, e.g. in the Electronic Stability Control (ESC) system. However, for purposes like alerting the driver/vehicle, adapting the vehicle to the road condition or proposing the best route in a navigating system, the information given by a classification of the friction into a relatively low number of classes, such as e.g. three, four or five classes, will be enough. The actual friction coefficients determined in each vehicle 200 may still be reported to the central processing arrangement 120 and used for determining the probabilities of different values for the road surface friction parameter $p_f$.

One way of using actual friction coefficients is to represent the friction potential as a histogram with a number of bins, each representing a certain interval for the friction coefficient. The friction coefficient may e.g. have a value between 0 and 1.2, and if this is represented as a histogram with 24 bins, the first bin will represent a friction coefficient of 0-0.05, the second bin will represent a friction coefficient of 0.05-0.10, etc. The central processing arrangement 120 may in this case be arranged to sort the actual friction coefficients calculated in each vehicle 200 into the correct bin, and thereby base the determining of the probabilities of friction within the different intervals for the road surface friction parameter $p_f$ on the actual friction coefficients reported from the vehicles 200.

The road roughness parameter $p_r$ may e.g. be assigned a value from 1 to 6, where 1 defines a "very smooth road" and 6 defines a "very rough road". It is of course possible to classify the road roughness in other, more detailed ways, e.g. using the International Roughness Index (IRI). However, for purposes like alerting the driver/vehicle, adapting the vehicle to the road condition or proposing the best route in a navigating system, the information given by a classification of the road roughness into a relatively low number of classes, such as e.g. three, four, five or six classes, will be enough. The actual road roughness determined in each vehicle 200 may still be reported to the central processing arrangement 120 and used for determining the probabilities of different values for the road roughness parameter $p_r$. This may e.g. be done in the way described above for the road surface friction parameter $p_f$.

The pothole parameter $p_h$ may e.g. be assigned a value of 0 ("no pothole present in the cell") or 1 ("pothole present in the cell"). It is possible to instead use a pothole scale of e.g. 1 to 4, where 1 defines "no pothole present in the cell", 2 defines "small pothole present in the cell", 3 defines "regular pothole present in the cell", and 4 defines "large pothole present in the cell". It is possible to instead use more specific values of e.g. 1 ("pothole right side"), 2 ("pothole left side"), and 3 ("pothole both sides").

The speedbump parameter $p_b$ may e.g. be assigned a value of 0 ("no speedbump present in the cell") or 1 ("speedbump present in the cell").

The obstacle parameter $p_o$ may e.g. be assigned a value of 0 ("no obstacle present in the cell") or 1 ("obstacle present in the cell"). It is possible to instead use an obstacle scale of e.g. 1 to 3, where 1 defines "no obstacle present in the cell", 2 defines "small obstacle present in the cell", and 3 defines "large obstacle present in the cell". The obstacles defined by the obstacle parameter $p_o$ should preferably be temporary obstacles, such as e.g. pieces of wood, rocks or other debris on the road. For each cell 320, different values for the road surface parameters may have different probabilities. A specific cell 320 may e.g. have a probability $\beta_{b0}$ of 0.8 (80%) of the speedbump parameter $p_b$ being 0, but at the same time a probability $\beta_{b1}$ of 0.2 (20%) of the speedbump parameter $p_b$ being 1. The probabilities may be based on road surface data received both from the vehicles 200 travelling on the road surface 300 and from other sources, such as e.g. sources of weather data or information from a road authority. The different items of road surface data received for each cell from the various sources may be aggregated by being weighted together into different probabilities of different values for each of the different road surface parameters. The weighting may e.g. be based on the age of the road surface data, so that new road surface data is weighted higher than old road surface data.

The weighting may also, or alternatively, be based e.g. on the general reliability of the source of the road surface data. Some sources of road surface data may be considered to be more reliable than other sources of road surface data, based e.g. on the types of sensors used to collect the road surface data. The reliability of a source of road surface data may also be determined automatically by the central processing arrangement 120 based e.g. on the correspondence of previous road surface data received from the source with other sources of road surface data. A vehicle 200 which consistently delivers road surface data that deviates from road surface data received from other vehicles 200 travelling on the same road surface 300 and delivering road surface data for the same cells 320 may e.g. be assigned a general low reliability and thus be weighted lower.

If road surface data is received from a road authority, it should preferably be weighted very high. The road authority may e.g. turn a part of a gravel road into an asphalt road, and this may affect both the road roughness and the road friction. The road surface authority may also e.g. arrange or remove speedbumps, and this of course affects the speedbump parameter. If the road authority reports that a speedbump has been arranged in a certain position, the probability $\beta_{b1}$ of the speedbump parameter $p_b$ being 1 may e.g. automatically be set to 1 (100%) for the affected cells 320, regardless of any road surface data received from vehicles 200. In the same way, if the road authority reports that a pothole in a certain position has been repaired, the probability $\beta_{h0}$ of the pothole parameter $p_h$ being 0 may automatically be set to 1 and the probability $\beta_{h1}$ of the pothole parameter $p_h$ being 1 may automatically be set to 0 for the affected cells 320, regardless of any road surface data received from vehicles. The probability $\beta_{h1}$ may then of course rise over time, since the pothole may come back after repair.

The different road surface parameters may also be correlated, so that a certain probability for one road surface parameter affects the probability for other road surface parameters. If there e.g. is a high probability of a pothole or a speedbump being present in a cell 320, this may affect the validity of the determined friction coefficients, since potholes and speedbumps may cause the wheels to slip, and thus affect the determined friction coefficients. The probabilities $\beta_{fx}$ of the different values for the road surface friction parameter $p_f$ may thus e.g. be determined based also e.g. on the probabilities $\beta_{hx}$ and $\beta_{bx}$ of the different values for the pothole parameter $p_h$ and the speedbump parameter $p_b$.

If no vehicles have passed a particular cell 320, and no other road surface data has been received from other sources for the cell 320, there are a number of different ways of assigning probabilities. It may e.g. be decided that since no information is available, the probability of each value for each parameter is equal. If there are e.g. three classes for the road surface friction parameter $p_f$, each of them may be assigned a probability $\beta_{fx}$ of 0.33 (33%), since they are all equally likely if there is no information available. However, for some parameters, the likelihood of a certain value is inherently higher than the likelihood of another value. It is e.g. much more likely that there is no speedbump present in a cell 320 than that there is a speedbump present in a cell 320, since most road stretches do not have speedbumps. It is therefore possible to assign the probabilities of different values for the different parameters based on statistical expectations for similar types of cells 320. The statistical expectation may e.g. be a high probability of the road surface friction parameter $p_f$ and the road roughness parameter $p_r$ having average values, and of the pothole parameter $p_h$ and the speedbump parameter $p_b$ having values defining no potholes and no speedbumps. Another way of assigning probabilities of the different values for the road surface parameters is to base them on the values of neighboring cells. However, as soon as any "real" road surface data has been received for the particular cell 320, the assigned probabilities should preferably be exchanged for new probabilities, calculated based on the received road surface data.

If road surface data is received at a high enough frequency, the calculated probabilities of the different values for the various road surface parameters of each cell 320 can be expected to be reasonably accurate. However, for less travelled road stretches, it may be advantageous if the calculated probabilities of the cell 320 are updated even if no new road surface data has been received for a cell 320. Such updating is preferably effected using an updating model that is specific for the road surface parameter, in order to provide a relevant prediction of what can be expected to happen between vehicle observations. Such a road surface parameter specific updating model is preferably adapted to the expected development over time of the probability for the specific road surface parameter. The updating model may e.g. be continuously improved by comparing predicted values with received road surface data the next time road surface data is received. The updating model may e.g. be based on the general model of a dynamic system:

$$x_{k+1} = f_k(x_k, u_k, w_k, \theta_k)$$

$$y_k = h_k(x_k, u_k, e_k, \theta_k)$$

The probabilities $\beta_{fx}$ of different values for the road surface friction parameter $p_f$ may e.g. be updated using a friction updating model that is preferably adapted to the expected development over time of the probabilities for the road surface friction parameter $p_f$. The road surface friction may e.g. change due to weather conditions. Current and expected weather conditions may be reported into the system 100 by various weather data sources, and the probabilities $\beta_{fx}$ of the road surface friction parameter $p_f$ having certain values may change based on these reported current and expected weather conditions according to a predefined friction updating model. If e.g. a certain cell 320 has a probability $\beta_{f1}$ of 0.9 (90%) of the road surface friction parameter $p_f$ being 1 ("low friction") at a point in time where the temperature is 0° C., and the temperature is expected to rise to 10° C. within a few hours, the friction can be expected to become higher over time. The friction updating model for such a situation may e.g. be linear, if the temperature is expected to rise approximately linearly. The probability $\beta_{f1}$ of the road surface friction parameter $p_f$ being 1 will thus be decreased linearly, and the probability $\beta_{f2}$ of the road surface friction parameter $p_f$ being 2 will be increased correspondingly. However, if actual measured road surface friction data is received, this should preferably be used instead of the calculated estimates. In such cases, the friction updating model may be updated based on the difference between the calculated values and the actual measured road surface friction data.

Figure 5A:
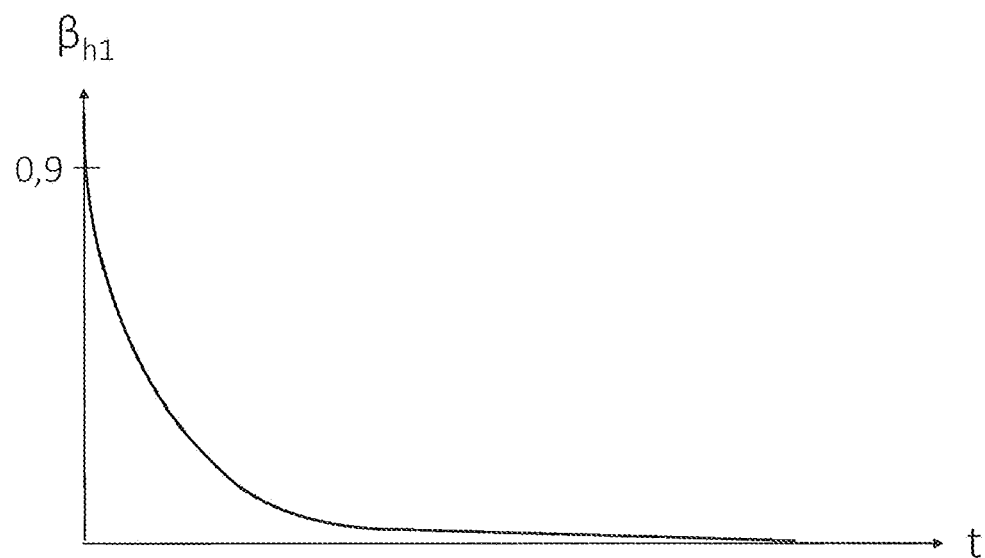
FIGS. 5a and 5b schematically illustrate road surface parameter probability updating models, in accordance with one or more embodiments described herein.

The probabilities $\beta_{hx}$ of different values for the pothole parameter $p_h$ may e.g. be updated using a pothole updating model that is preferably adapted to the expected development over time of the probabilities for the pothole parameter $p_h$. If the probability $\beta_{h1}$ of the pothole parameter $p_h$ being 1 for a cell 320 is e.g. set to 0.9 based on received road surface data, and no further road surface data is received for the cell, there may be a chance that the pothole has been repaired without this being reported from any road surface authority. In such a case, a pothole updating model using a forgetting factor should preferably be used, so that the probability $\beta_{h1}$ of the pothole parameter $p_h$ being 1 is decreased over time and the probability $\beta_{h0}$ of the pothole parameter $p_h$ being 0 is correspondingly increased. The pothole updating model may e.g. involve a relatively fast exponential decreasing of the probability $\beta_1$, as shown in FIG. 5*a*.

Figure 5B:
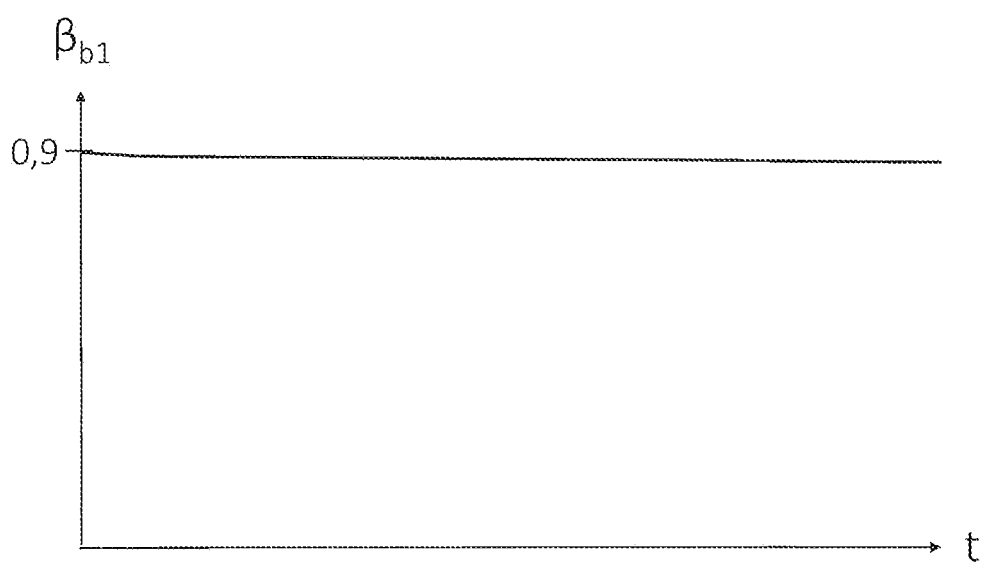

The probabilities $\beta_{bx}$ of different values for the speedbump parameter $p_b$ may e.g. be updated using a speedbump updating model that is preferably adapted to the expected development over time of the probabilities for the speedbump parameter $p_b$. If the probability $\beta_{b1}$ of the speedbump parameter $p_b$ being 1 for a cell 320 is e.g. set to 0.9 based on received road surface data, and no further road surface data is received for the cell, there may be a chance that the speedbump has been removed without this being reported from any road surface authority. In such a case, a speedbump updating model using a forgetting factor should preferably be used, so that the probability $\beta_{b1}$ of the speedbump parameter $p_b$ being 1 is decreased over time and the probability $\beta_{b0}$ of the speedbump parameter $p_b$ being 0 is correspondingly increased. The speedbump updating model may e.g. involve a relatively slow exponential decreasing of the probability $\beta_{b1}$, as shown in FIG. 5*b*.

Since road roughness may also change over time, the probabilities $\beta_{rx}$ of different values for the road roughness parameter $p_r$ may e.g. be updated using a road roughness updating model that is preferably adapted to the expected development over time of the probabilities for the road roughness parameter $p_r$. The road roughness updating model may e.g. involve a relatively slow exponential change of the probabilities $\beta_{rx}$ of different values for the road roughness parameter $p_r$.

Since the obstacles defined by the obstacle parameter $p_o$ are preferably temporary obstacles, such as e.g. pieces of wood, rocks or debris on the road, the probabilities $\beta_{ox}$ of different values for the obstacle parameter $p_o$ may change quickly. It is quite likely that a temporary obstacle has been removed when a certain time has passed, and thus the obstacle updating model may e.g. involve a relatively fast exponential decreasing of the probability $\beta_{o1}$ of the obstacle parameter $p_o$ being 1 in order to be adapted to the expected development over time of the probabilities for the obstacle parameter $p_o$.

The above approach is now illustrated by a simple example for one specific cell 320, using the general model $$x_k = \lambda x_{k-1}$$

$$y_n = x + e_n$$

where the first equation is a time-update, used to update the state $x_k$ between up-linked values from the vehicles to the central processing arrangement 120. Taking the pothole identification as an example, during initialization $x_0$ is set to the initial probability $\beta_{hx}$ for the exemplified pothole parameter $p_h$. The parameter $\lambda$ controls the forgetting of this initial probability $\beta_{hx}$ over time when no measurement is obtained from any vehicle. However, if the removal of the pothole is reported from a road surface authority, this will instantaneously set $x_k$ to zero, indicating that the probability is zero for a pothole to be found in this cell 320.

Measurements $y_n$ from a plurality of vehicles 200 are used to estimate the unknown probability x for the presence of a pothole in the cell 320. Here we assume an additive model, where $e_n$ is measurement noise caused by for example GPS position inaccuracies. Assuming that $y_n$ can take the values pothole detected (1) or pothole not detected (0), the estimate of the probability x may be given by the measurement update $$x_k = x_{k-1} + (y_n - x_{k-1})/n$$

which is basically a recursive calculation of the average value for n measurements. Hence, the time-update is calculated periodically in the central processing arrangement 120 over time, but this measurement update is calculated only when a measurement is received.

This scheme may be improved by indicating so called hotspots on the map. For example, if one vehicle has detected that a pothole is present in a particular cell 320, this cell 320 is then set to be a hotspot. Vehicles entering this cell/hotspot 320 will then be forced to report if a pothole is detected or not.

Other approaches also available are e.g. occupancy grid mapping and other statistical methods with similar properties.

The system 100 may thus comprise a central processing arrangement 120 and sensors 130 arranged in each of the plurality of vehicles 200. The central processing arrangement 120 may be arranged to: map at least a part of the road surface 300 with a number of cells 320; receive road surface data for the cells 320, which road surface data has been collected by the sensors 130 as the plurality of vehicles 200 travel on the road surface 300; and calculate the probability for at least one road surface parameter for each cell 320 travelled by the plurality of vehicles 200 based at least on road surface data received from the plurality of vehicles 200.

The central processing arrangement 120 may further be arranged to update this probability based on a road surface parameter specific updating model that is preferably adapted to the expected development over time of the probability for the specific road surface parameter until further road surface data is received for the cell 320. The road surface parameter specific updating model may e.g. include the probability increasing or decreasing exponentially over time. This enables accurate estimations of road surface parameters over time even if no new road surface data has been received.

The at least one sensor 130 may e.g. provide information about
- a pressure of the tire
- a temperature of the tire
- an ambient temperature
- an axle height
- a suspension pressure
- a suspension height
- a tire type, manually entered via a human-machine-interface
- an estimated friction potential from an ABS braking
- an estimated friction potential from an TCS event
- a normalized traction force on the wheel
- a friction related value
- a torque applied on the wheel
- a longitudinal acceleration
- a lateral acceleration
- a vertical acceleration
- a brake pressure
- a yaw rate
- a vehicle speed
- a wheel speed
- a steering wheel angle
- a wheel angle
- a wiper speed
- an ambient humidity
- values derived from any type of image (optical, infrared, etc.) such as road surface temperature, sky cloudiness, etc.
- values derived from any type of external sensor such as radar, laser etc.
- a control flag register.

Examples of flags of the control flag register may e.g. include indications of whether ESC control is in progress, ABS braking is in progress, TCS is in progress, braking is in progress, a gear shift is in progress, the clutch pedal is engaged, a reverse gear is engaged, a trailer is connected, or a cruise control is engaged.

Figure 6:
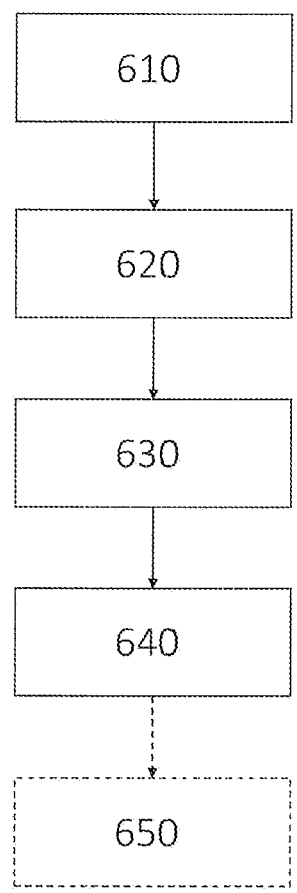
FIG. 6 schematically illustrates a method for monitoring the condition of a road surface, in accordance with one or more embodiments described herein.

FIG. 6 schematically illustrates a method 600 for monitoring the condition of a road surface 300 travelled by a plurality of vehicles 200, each comprising at least one sensor 130. The method comprises:

Step 610: mapping the road surface 300 with a number of cells 320.

Step 620: determining road surface data for the cells 320 based on measurements made by the plurality of sensors 130 as the plurality of vehicles 200 travel on the road surface 300.

Step 630: transferring the road surface data from the plurality of vehicles 200 to a central processing arrangement 120.

Step 640: calculating the probability for at least one road surface parameter for each cell 320 travelled by the plurality of vehicles 200 based on road surface data received from the plurality of vehicles 200.

This enables an easy merging of many different kinds of road surface data, e.g. in the cloud, in order to provide accurate road surface parameters.

In embodiments, the method 600 may further comprise:

Step 650: updating this probability based on a road surface parameter specific updating model that is adapted to the expected development over time of the probability for the specific road surface parameter until further road surface data is received for the cell 320.

The road surface parameter specific updating model may e.g. include the probability increasing or decreasing exponentially over time.

The probability of each of a predefined number of possible values or value intervals for the at least one road surface parameter may be calculated. The sum of the probabilities of these values or value intervals for the road surface parameter should preferably be 1 (100%). It is however not necessary that the sum of the probabilities of these values or value intervals for the road surface parameter is 1.

The probability for the at least one road surface parameter may also be calculated in the form of a function, such as e.g. a polynomial function.

The at least one road surface parameter may e.g. comprise a road surface friction parameter $p_f$, a road roughness parameter $p_r$, a pothole parameter $p_h$, a speedbump parameter $p_b$, and/or an obstacle parameter $p_o$.

The at least one sensor may e.g. comprise a rotational speed sensor 130 for each wheel of each of the plurality of vehicles 200.

The determining 620 of the road surface data for each vehicle may e.g. take place in at least one vehicle processing device 110 comprised in the vehicle 200 based on signals from the at least one sensor 130 in the vehicle 200.

The calculating 640 of the probability for the value for the at least one road surface parameter may e.g. be based also on road surface data received from other sources, such as sources of weather data. The weather data may e.g. relate to current and/or expected temperature, precipitation, water amount and/or snow amount. The weather data may e.g. be processed using a weather model that estimates the friction as a probability distribution based on the weather data.

The transferring 630 of the road surface data from the plurality of vehicles 200 to the central processing arrangement 120 may e.g. take place via wireless link.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. System for monitoring the condition of a road surface travelled by a plurality of vehicles, each comprising at least one sensor, the system comprising a central processing arrangement arranged to:
   map at least a part of the road surface with a number of cells;
   receive road surface data for the cells, which road surface data is based on measurements made by the sensors as the plurality of vehicles travel on the road surface; and
   calculate a probability of a value for at least one road surface parameter for each cell travelled by the plurality of vehicles based at least on road surface data received from the plurality of vehicles,
   wherein the central processing arrangement is arranged to calculate said probability by aggregating items of road surface data received from at least two different vehicles by weighting them together into different probabilities of different values for each at least one road surface parameter.

2. System according to claim 1, wherein the at least one road surface parameter comprises a road roughness parameter ($p_r$), a pothole parameter ($p_h$), a speedbump parameter ($p_b$) and/or an obstacle parameter ($p_o$).

3. System according to claim 1, wherein the central processing arrangement is arranged to base the weighting on the age of the road surface data, so that new road surface data is weighted higher than old road surface data.

4. System according to claim 1, wherein the central processing arrangement is arranged to base the weighting on a reliability score for each vehicle, where central processing arrangement is arranged to determine the value of the reliability score based on a comparison of previous road surface data received from the vehicle with previous road surface data received from other vehicles, so that road surface data from a vehicle having a low reliability score is weighted lower than road surface data from a vehicle having a high reliability score.

5. System according to claim 1, wherein the central processing arrangement is arranged to calculate the probability of the value for the at least one road surface parameter in the form of a function, e.g. a polynomial function.

6. System according to claim 1, wherein the central processing arrangement is arranged to update the probability based on a road surface parameter specific updating model that is adapted to the expected development over time of the probability for the specific road surface parameter until further road surface data is received for the cell, wherein the road surface parameter specific updating model includes the probability increasing or decreasing exponentially over time.

7. System according to claim 1, wherein the central processing arrangement is arranged to calculate the probability of each of a predefined number of possible values or value intervals for the at least one road surface parameter, wherein the sum of the probabilities of these values or value intervals for the road surface parameter preferably is 1 (100%).

8. System according to claim 1, wherein the at least one sensor comprises a rotational speed sensor for each wheel of each of the plurality of vehicles.

9. System according to claim 1, wherein each vehicle comprises at least one vehicle processing device, and the road surface data for each vehicle is determined in the at least one vehicle processing device of the vehicle based on signals from the at least one sensor in the vehicle.

10. System according to claim 1, wherein the central processing arrangement is arranged to calculate the probability for the at least one road surface parameter based also on road surface data received from other sources, such as sources of weather data.

11. Method for monitoring the condition of a road surface travelled by a plurality of vehicles, each comprising at least one sensor, the method comprising:
   mapping at least a part of the road surface with a number of cells;
   determining road surface data for the cells based on measurements made by the sensors as the plurality of vehicles travel on the road surface;
   transferring the road surface data from the plurality of vehicles to a central processing arrangement; and calculating a probability of a value for at least one road surface parameter for each cell travelled by the plurality of vehicles based at least on road surface data received from the plurality of vehicles, wherein said probability is calculated by aggregating items of road surface data received from at least two different vehicles by weighting them together into different probabilities of different values for each at least one road surface parameter.

12. Method according to claim 11, wherein the at least one road surface parameter comprises a road roughness parameter ($p_r$), a pothole parameter ($p_h$), a speedbump parameter ($p_b$), and/or an obstacle parameter ($p_o$).

13. Method according to claim 11, further comprising basing the weighting on the age of the road surface data, so that new road surface data is weighted higher than old road surface data.

14. Method according to claim 11, further comprising basing the weighting on a reliability score for each vehicle, where the reliability score is determined based on a comparison of previous road surface data received from the vehicle with previous road surface data received from other vehicles, so that road surface data from a vehicle having a low reliability score is weighted lower than road surface data from a vehicle having a high reliability score.

15. Method according to claim 11, wherein the probability of the value for the at least one road surface parameter is calculated in the form of a function, such as e.g. a polynomial function.

16. Method according to claim 11, further comprising updating the probability based on a road surface parameter specific updating model that is adapted to the expected development over time of the probability for the specific road surface parameter until further road surface data is received for the cell, wherein the road surface parameter specific updating model includes the probability increasing or decreasing exponentially over time.

17. Method according to claim 11, wherein the probability of each of a predefined number of possible values or value intervals for the at least one road surface parameter is calculated, wherein the sum of the probabilities of these values or value intervals for the road surface parameter preferably is 1 (100%).

18. Method according to claim 11, wherein the at least one sensor comprises a rotational speed sensor for each wheel of each of the plurality of vehicles.

19. Method according to claim 11, further comprising determining the road surface data for each vehicle in at least one vehicle processing device comprised in the vehicle based on signals from the at least one sensor of the vehicle.

20. Method according to claim 11, further comprising calculating the probability for the at least one road surface parameter based also on road surface data received from other sources, such as sources of weather data.

* * * * *